US012704138B2

(12) United States Patent
Davis et al.

(10) Patent No.: US 12,704,138 B2
(45) Date of Patent: Aug. 11, 2026

(54) CONNECTING APPARATUS AND SUSPENSION ASSEMBLY

(71) Applicant: GRIPPLE LIMITED, Sheffield (GB)

(72) Inventors: Simon Davis, Sheffield (GB); Samuel White, Sheffield (GB); Oliver Sunderland, Sheffield (GB)

(73) Assignee: GRIPPLE LIMITED (GB)

( * ) Notice: Subject to any disclaimer, the term of this patent is extended or adjusted under 35 U.S.C. 154(b) by 271 days.

(21) Appl. No.: 18/575,203

(22) PCT Filed: Jun. 24, 2022

(86) PCT No.: PCT/IB2022/055873
§ 371 (c)(1),
(2) Date: Dec. 28, 2023

(87) PCT Pub. No.: WO2023/275688
PCT Pub. Date: Jan. 5, 2023

(65) Prior Publication Data

US 2024/0337280 A1 Oct. 10, 2024

(30) Foreign Application Priority Data

Jun. 28, 2021 (GB) ..................................... 2109262
Jun. 28, 2021 (GB) ..................................... 2109264
(Continued)

(51) Int. Cl.
*F16B 2/14* (2006.01)
*F16L 3/24* (2006.01)
*F16M 13/02* (2006.01)

(52) U.S. Cl.
CPC ................ *F16B 2/14* (2013.01); *F16L 3/243* (2019.08); *F16M 13/027* (2013.01);
(Continued)

(58) Field of Classification Search
CPC .... F16B 2/065; F16B 2/14; F16B 2/18; F16B 2/185; F16B 7/044; F16B 7/0446;
(Continued)

(56) References Cited

U.S. PATENT DOCUMENTS 3,878,757 A * 4/1975 Puklus, Jr. .......... F16B 37/0814 411/433
4,083,393 A * 4/1978 Okada ................ F16B 37/0857 411/935.1
4,363,164 A * 12/1982 Okada ................ F16B 37/0857 403/16
4,884,914 A * 12/1989 Shultz ................ F16B 37/0857 403/324
(Continued)

FOREIGN PATENT DOCUMENTS

GB 2586780 A 3/2021
WO 2018/100329 A1 6/2018
(Continued)

*Primary Examiner* — Josh Skroupa
(74) *Attorney, Agent, or Firm* — Clark Hill PLC; James R. Foley

(57) ABSTRACT

A connecting apparatus comprises a support member and a fastening arrangement to secure the support member to an elongate member. The fastening arrangement comprises a holding component which receives the elongate member. The through hole has a holding region and a release region. The holding component has cooperating formations at the holding region to cooperate with corresponding formations on the elongate member. The holding component is movable relative to the support member. In a holding position, the elongate member can be received in the holding region, and the cooperating formations of the holding component cooperate with the corresponding formations of the elongate member to fasten the elongate member to the holding component. In a released position, the elongate member can be received in the release region, thereby allowing the elongate member to be released.

18 Claims, 11 Drawing Sheets

(30) Foreign Application Priority Data

Jun. 23, 2022 (GB) ..................................... 2209226
Jun. 23, 2022 (GB) ..................................... 2209230

(52) U.S. Cl.
CPC ........ *Y10T 403/591* (2015.01); *Y10T 403/599* (2015.01); *Y10T 403/604* (2015.01); *Y10T 403/608* (2015.01)

(58) Field of Classification Search
CPC .......... F16B 7/0473; F16B 7/18; F16B 7/187; F16B 37/0814; F16B 37/0857; F16L 3/243; F16L 3/2431; F16M 13/027; Y10T 403/59; Y10T 403/591; Y10T 403/599; Y10T 403/60; Y10T 403/602; Y10T 403/604; Y10T 403/608; Y10T 403/7009; Y10T 403/7064; Y10T 403/7066; Y10T 403/76
USPC .... 403/321, 322.1, 325, 326, 327, 328, 330, 403/350, 374.1, 374.2, 409.1; 411/433, 411/437
See application file for complete search history.

(56) References Cited

U.S. PATENT DOCUMENTS 6,860,693 B2 * 3/2005 Jones .................. F16B 37/0814 411/433
10,018,216 B1 * 7/2018 Espinosa ............. F16B 37/0814
10,520,113 B1 * 12/2019 Thompson .............. F16B 2/065
10,914,333 B2 * 2/2021 Davis ........................ F16L 3/22
11,396,959 B2 * 7/2022 Reynolds ................ F16L 3/223
2003/0115723 A1 * 6/2003 Shuey ................... F16G 11/106 24/136 R
2004/0113030 A1 * 6/2004 Wang .................. F16B 37/0857 248/146
2004/0161317 A1 8/2004 Jones
2015/0316203 A1 11/2015 Zhang
2018/0003204 A1 1/2018 Knutson

FOREIGN PATENT DOCUMENTS

WO 2020/036728 A1 2/2020
WO 2021/048666 A1 3/2021

* cited by examiner 25
32
32
24
34
16
14
56
12
10
18
56
III
32
34
16
14
25
24

16
X
Y
12
18
36
38

30
26
36
28
20
22
Y
X
16
12
18
28
X
Y
36
30

36
26
38
22
20
Y
X 61
62
54
48
44
42
46
52
62
48
41
59
46
60
40

40
52
61
62
64
62
48
64
46
42
44
60
54
41
48

CONNECTING APPARATUS AND SUSPENSION ASSEMBLY

This invention relates to connecting apparatus. This invention relates to suspension assemblies. More particularly, but not exclusively, this invention relates to connecting apparatus for use in suspension assemblies.

It is known to suspend pipes and cable trays from roofs or ceilings by means of brackets attached to threaded rods. Support members, such as brackets or struts for supporting articles, are attached to the threaded rods. The attachment of the support members to the rods requires nuts to be screwed onto the rods. This can be time consuming.

According to a general aspect of this invention, there is provided a connecting apparatus comprising:

a support member; and a cartridge mounted on the support member, the cartridge comprising a fastening arrangement for connecting an elongate suspension member to the support member.

The cartridge may include a housing for the fastening arrangement.

According to one aspect of this invention, there is provided a fastening arrangement comprising:

a holding component defining a through hole for receiving an elongate member through the holding component, the through hole having a holding region and a release region, the holding component having cooperating formations at the holding region;

wherein the holding component is movable between a holding position and a released position;

whereby, in the holding position, the elongate member can be received in the holding region, and the cooperating formations of the holding component cooperate with the corresponding formations of the elongate member to fasten the elongate member to the holding component, and in the released position, the elongate member can be received in the release region, thereby allowing the elongate member to be released from the holding component.

According to another aspect of this invention, there is provided a connecting apparatus comprising:

a support member; and a fastening arrangement to secure the support member to an elongate member;

wherein the fastening arrangement comprises a holding component, the holding component defining a through hole for receiving the elongate member through the holding component, the through hole having a holding region and a release region, the holding component having cooperating formations at the holding region;

wherein the holding component is movable relative to the support member between a holding position and a released position;

whereby, in the holding position, the elongate member can be received in the holding region, and the cooperating formations of the holding component cooperate with the corresponding formations of the elongate member to fasten the elongate member to the holding component, and in the released position, the elongate member can be received in the release region, thereby allowing the elongate member to be released from the holding component.

According to another aspect of this invention, there is provided a suspension assembly comprising a connecting apparatus as described above and an elongate member.

The connecting apparatus may comprise two of the fastening arrangements, each being received in a respective end region of the support member. Alternatively, the connecting apparatus may be receivable in a further support member to provide the suspension assembly. The connecting apparatus may be receivable in one end region of the further support member. A further connecting apparatus may be receivable in an opposite end region of the further support member.

According to another aspect of this invention, there is provided a suspension assembly comprising:

an elongate member;

a support member for supporting an article; and a fastening arrangement to secure the support member to the elongate member;

wherein the fastening arrangement comprises a holding component, the holding component defining a through hole for receiving the elongate member through the holding component, the through hole having a holding region and a release region, the holding component having cooperating formations at the holding region to cooperate with corresponding formations on the elongate member;

wherein the holding component is movable relative to the support member between a holding position and a released position;

whereby, in the holding position, the elongate member can be received in the holding region, and the cooperating formations of the holding component cooperate with the corresponding formations of the elongate member to fasten the elongate member to the holding component, and in the released position, the elongate member can be received in the release region, thereby allowing the elongate member to be released from the holding component.

The connecting apparatus may be a connector. The fastening arrangement may be a fastener. The support member may be a support. The holding component may be a holder. The cooperating formations may be gripping formations.

The connecting apparatus may include a cartridge. The suspension assembly may include a cartridge. The cartridge may comprise the fastening arrangement. The cartridge may include a housing in which the clamping arrangement is housed.

The holding component may be pivotally movable relative to the support member between the holding and released positions. The holding component may be tiltable relative to the support member between the holding and released conditions.

The support member may be for supporting the article. The suspension assembly may comprise two of the fastening arrangements, each being received in a respective end region of the support member.

The fastening arrangement may further include an urging member to urge the holding component to the holding position. The urging member may comprise a resilient urging member. The urging member may comprise a spring, such as a compression spring.

The elongate member may be an elongate threaded article. The threaded article may comprise a threaded rod. The cooperating formations of the holding component at the holding region may be threads of the holding component. The corresponding components of the elongate member may be threads of the threaded article. Alternatively, the elongate member may be a smooth rod or a cable, wire, wire rope, or the like.

The holding region and the release region of the through hole may extend obliquely relative to each other. The holding region may have a first main axis along which the elongate member may extend when the holding component is in the holding position.

The through hole may have a further holding region. The release region may be arranged between the holding region and the further holding region. The first main axis of the holding region may be the main axis of the further holding region. The holding component may comprise cooperating formations at the further holding region. The cooperating formations of the holding component at the further holding region may be threads of the holding component.

The release region may have a second main axis along which the elongate member may extend when the holding component is in the released position. The first main axis and the second main axis may extend obliquely relative to each other.

The first main axis and the second main axis may extend at an angle to each other of between 5° and 25°, desirably between 10° and 20°, more desirably about 15°.

The support member may be an elongate support member. The support member may have an opening to receive the elongate member. The opening may be aligned with the through hole.

The support member may define an opening through which the elongate member may extend. The support member may have an upper face defining the opening. The opening may be aligned with the through hole defined by the holding component.

The support member may have two openings opposite each other. The openings may be defined in opposite upper and lower faces of the support member.

Both openings may be aligned with the through hole defined by the holding component. Thus, the aligned openings and the through hole allow the elongate member to be received through the support member and the holding component.

The fastening arrangement may further comprise a positioning arrangement for positioning the holding component in the holding position or the released position. The moving of the holding component relative to the elongate member may comprise tilting the holding component relative to the elongate member.

The positioning arrangement may be in the form of a tilting arrangement for tilting the holding component between the holding and released positions.

The moving of the holding component relative to the elongate member may comprise pivoting the holding component relative to the elongate member. The moving of the holding component relative to the elongate member may comprise pivoting the holding component relative to the support member.

The holding component may be pivotally mounted on the support member. The holding component may comprise a main part defining the through hole.

The holding component may comprise a pivot member extending from the main part. The pivot member may be received in a pivot aperture defined by the support member.

The holding component may comprise two of the pivot members. The pivot members may extend opposite each other from the main part. The pivot members may be received in respective pivot apertures defined by the support member.

The positioning arrangement may comprise a conveying component which may convey the holding component between the holding and released positions. The urging member may engage the conveying component. The conveying component may be a conveyor.

The conveying component may be movable along the support member to effect tilting of the holding component. The conveying component may be slidable along the support member to effect tilting of the holding component. The conveying component may comprise a carriage.

The conveying component may comprise a first engaging region for receiving the holding component in the holding position. The first engaging region may engage the holding component in the holding position.

The conveying component may comprise a second engaging region for receiving the holding component in the released position. The second engaging region may engage the holding component in the release position.

The conveying component may be movable between a first position in which the first engaging region of the movable member receives the holding component, and a second position in which the second engaging region of the conveying component receives the holding component.

The first and second engaging regions may be arranged obliquely relative to each other. The first and second engaging regions may be arranged at a reflex angle relative to each other. The angle may be between 185° and 205°, desirably between 190° and 200°, more desirably about 195°. The first engaging region may be closer to the urging member than the second engaging member.

The first engaging region may have a first surface for engaging the holding component. The second engaging region may have a second surface for engaging the holding component. The first and second surfaces may be arranged at said reflex angle.

The first engaging region may have two of the aforesaid first surfaces. The first surfaces may be spaced from each other. The first surfaces may extend substantially parallel to each other.

The second engaging region may have two of the aforesaid second surfaces. The second surfaces may be spaced from each other. The second surfaces may extend substantially parallel to each other.

In the holding position of the holding component, the first engaging region of the conveying component may be aligned with the, or each, opening in the support member. In the released position of the holding component, the second engaging region of the conveying component may be aligned with the, or each, opening in the support member.

The conveying component and the holding component may have cooperating guide formations for guiding the holding component to the release position. The conveying component may have two of the guide formations. The holding component may have two of the guide formations.

The guide formations of the holding component may be arranged on opposite sides of the main part. The guide formations of the holding component may comprise sloping surfaces on the main part. The sloping surfaces may be provided in recesses defined by the main part. The through hole may be arranged between the guide formations of the holding component.

The conveying component may have opposite end portions. A first end portion may engage the urging member. The guide formations of the conveying component may be arranged on the second end portion.

The guide formations of the conveying component may comprise projecting members. The projecting members may project from the second end portion towards the first end portion. The guide formations of the conveying component may engage the guide formations of the holding component to guide the holding component to the release position.

The guide formations of the holding component and the conveying component may comprise cooperating surfaces that slide across one another as the holding component moves to the release position.

The urging member may engage the conveying component to urge the first engaging region into alignment with the opening in the support member.

The support member may have a reaction formation engaged by the urging member. The urging member may extend between the holding component and the first end portion. The urging member may extend between the reaction formation and the first end portion of the holding component.

The reaction formation may comprise a deformed region of the support member. The deformed region may extend inwardly of the support member. The conveying component may have a locating formation to locate the urging member on the first end portion.

The locating formation may be on the first end portion. The locating formation may comprise a lug. The lug may extend towards the reaction formation. One end of the urging member may engage around the locating formation. The lug may be provided on the first end portion. The locating formation may extend from the first end portion towards the reaction formation. The locating formation may be substantially cylindrical. One end of the urging member may engage around the locating formation.

The suspension assembly may comprise two of the elongate members, two of the fastening arrangements and a single support member.

An embodiment of the invention will now be described by way of example only, with reference to the accompanying drawings, in which.

Figure 1:
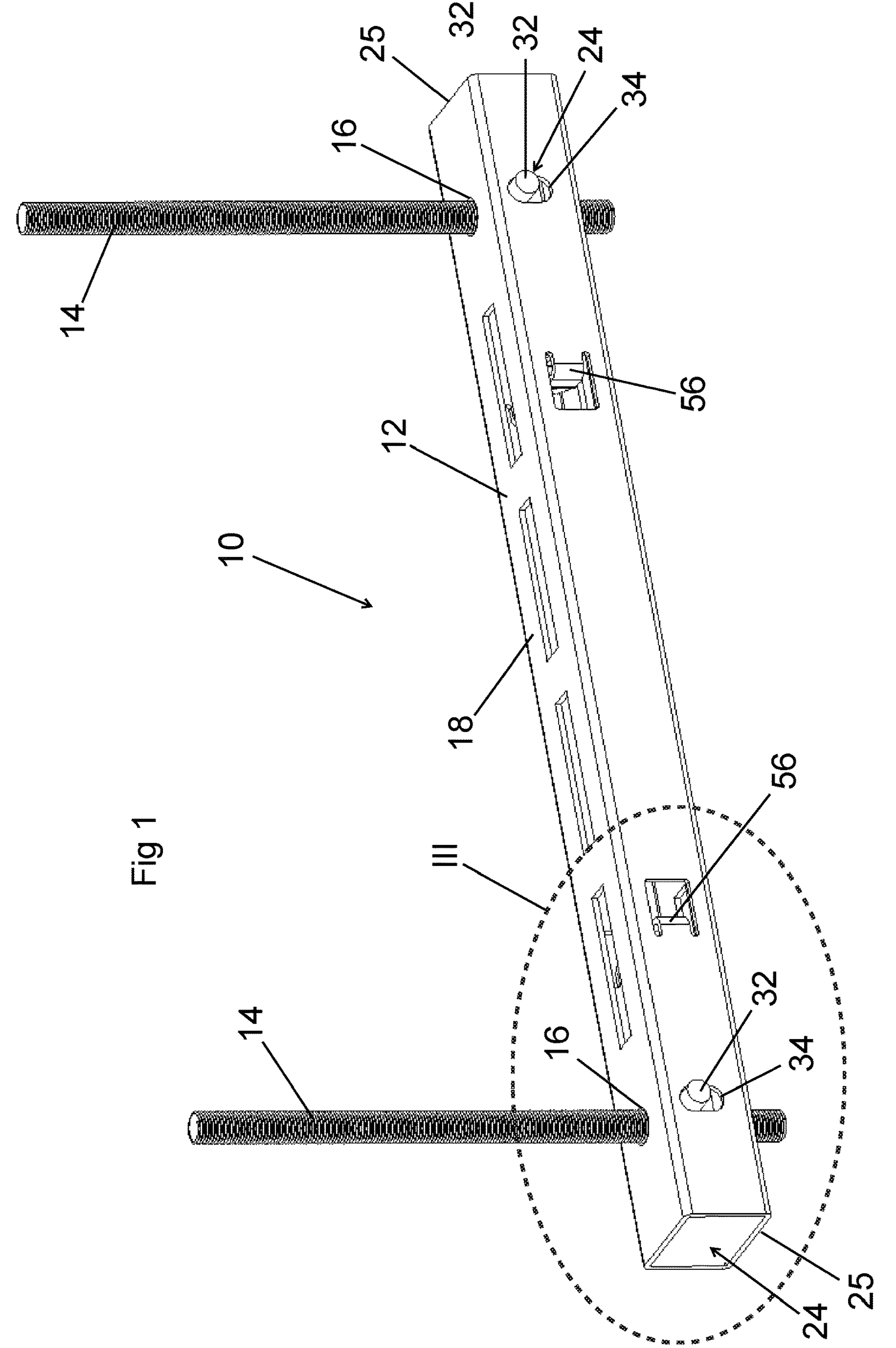
FIG. 1 is a perspective view of a suspension assembly.
Figure 2:
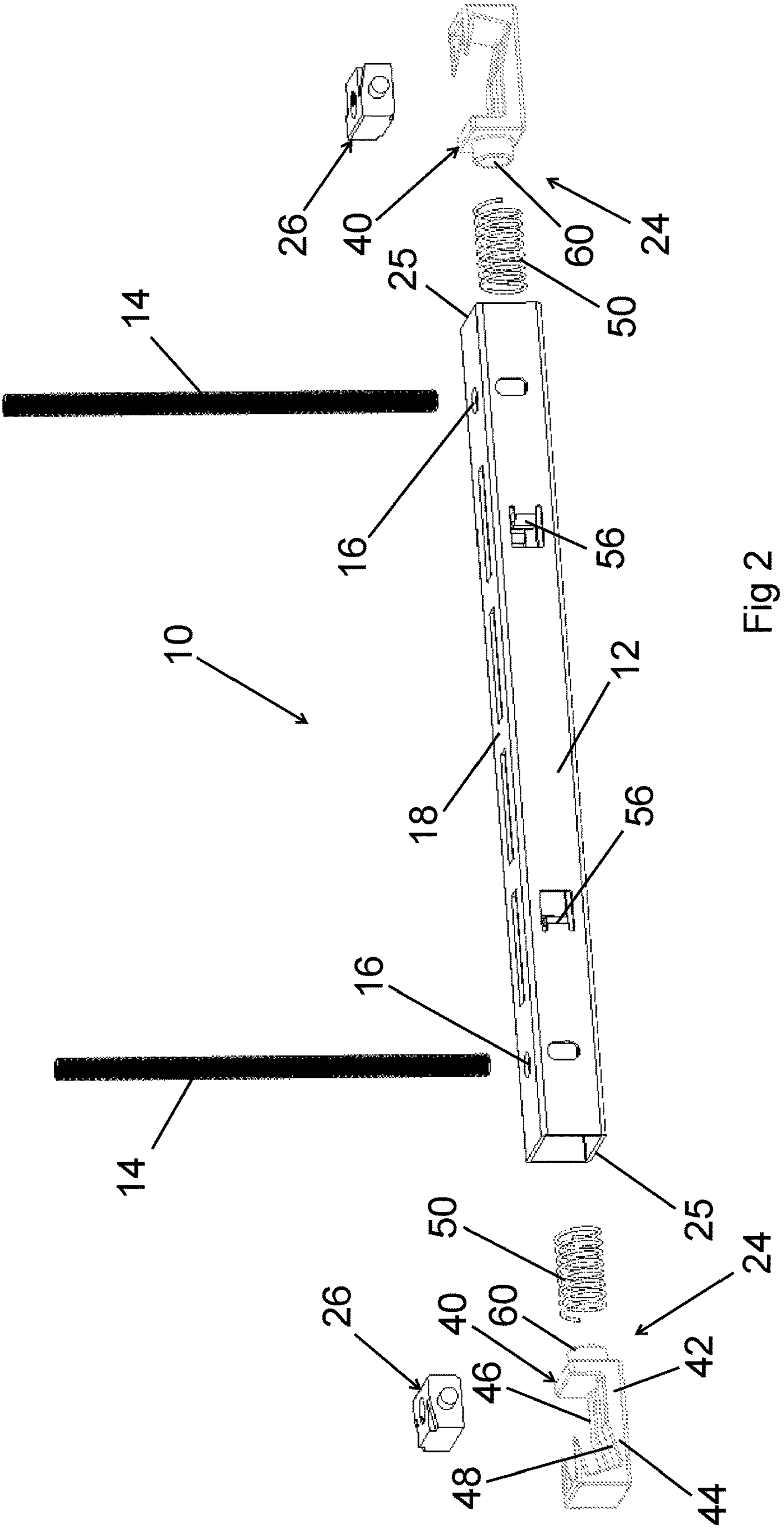
FIG. 2 is an exploded view of the suspension assembly shown in FIG. 1.

FIGS. 1 and 2 show a suspension assembly 10 comprising a support member 12 for supporting an article, such as a cable tray or pipework. The suspension assembly 10 is attached to an upper support, such as a roof beam or a ceiling, in a building.

Figure 3:
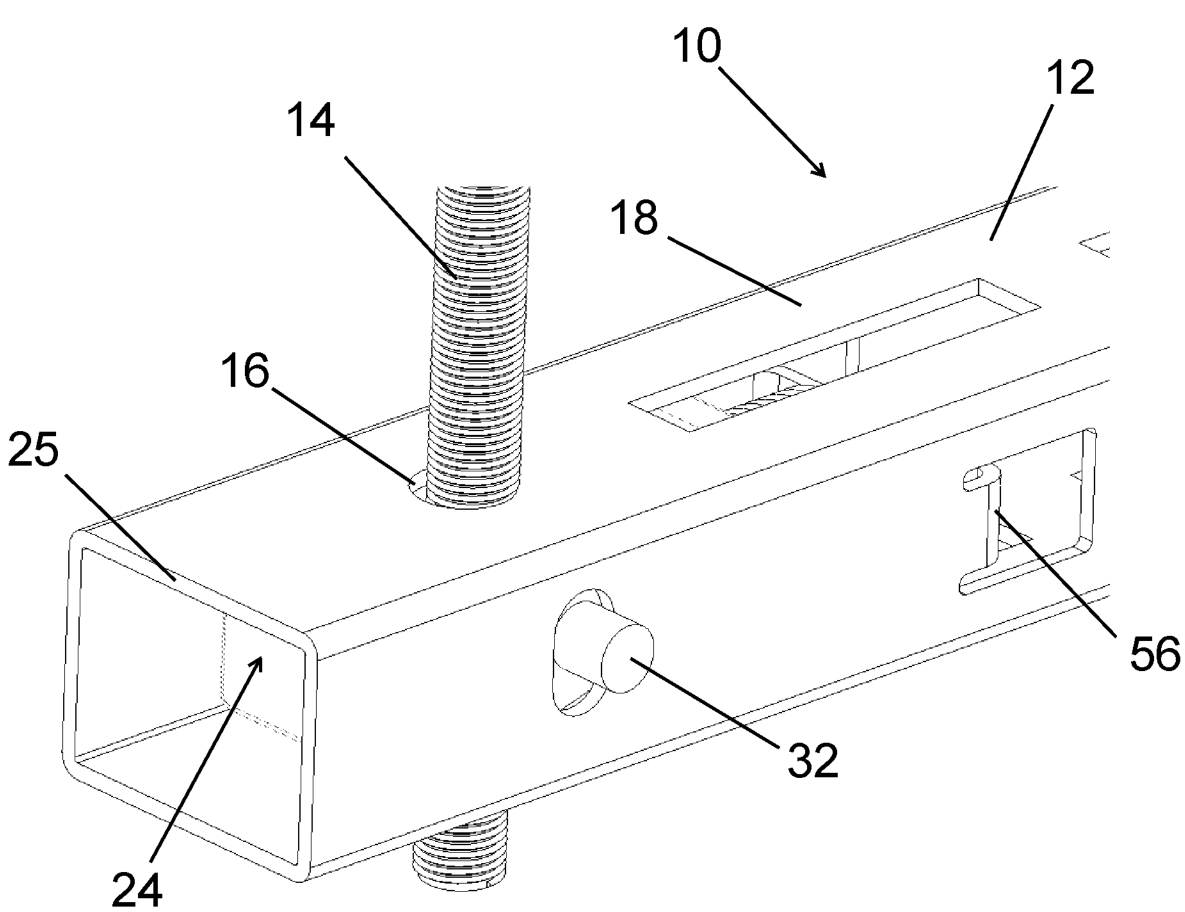
FIG. 3 is a view of the region marked III in FIG. 1.

The support member 12 is elongate and, as shown in FIGS. 1, 2 and 3, has a substantially square end profile. The support member 12 is suspended at its opposite end regions on two elongate members in the form of threaded rods 14.

Each threaded rod 14 extends through the support member 12 via an upper opening 16 in an upper face 18 of the support member 12, and through a lower opening 20 in a lower face 22 of the support member 12. The suspension assembly 10 further includes two fastening arrangements 24 through which the threaded rods 14 extend.

Figure 4:
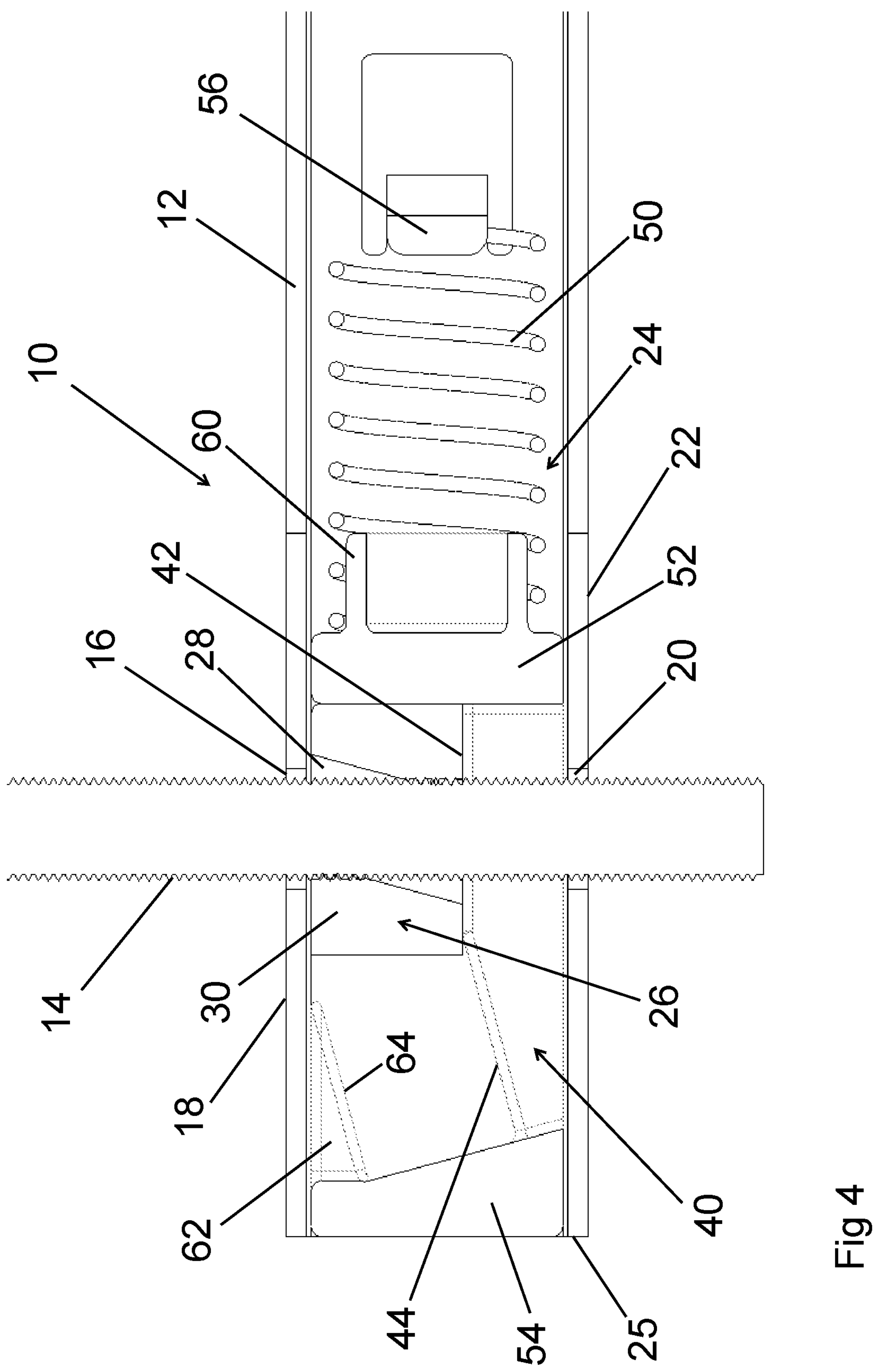
FIG. 4 is a sectional side view of the region marked III in FIG. 1.

Referring to FIG. 4, a respective one of the fastening arrangements 24 is received in each end region of the support member 12. Each of the opposite ends 25 of the support member 12 is open to allow access to the fastening arrangement 24 therein. Each fastening arrangement 24 comprises a holding component 26 defining a through hole 28 for receiving the threaded rod 14 therethrough.

Figure 13:
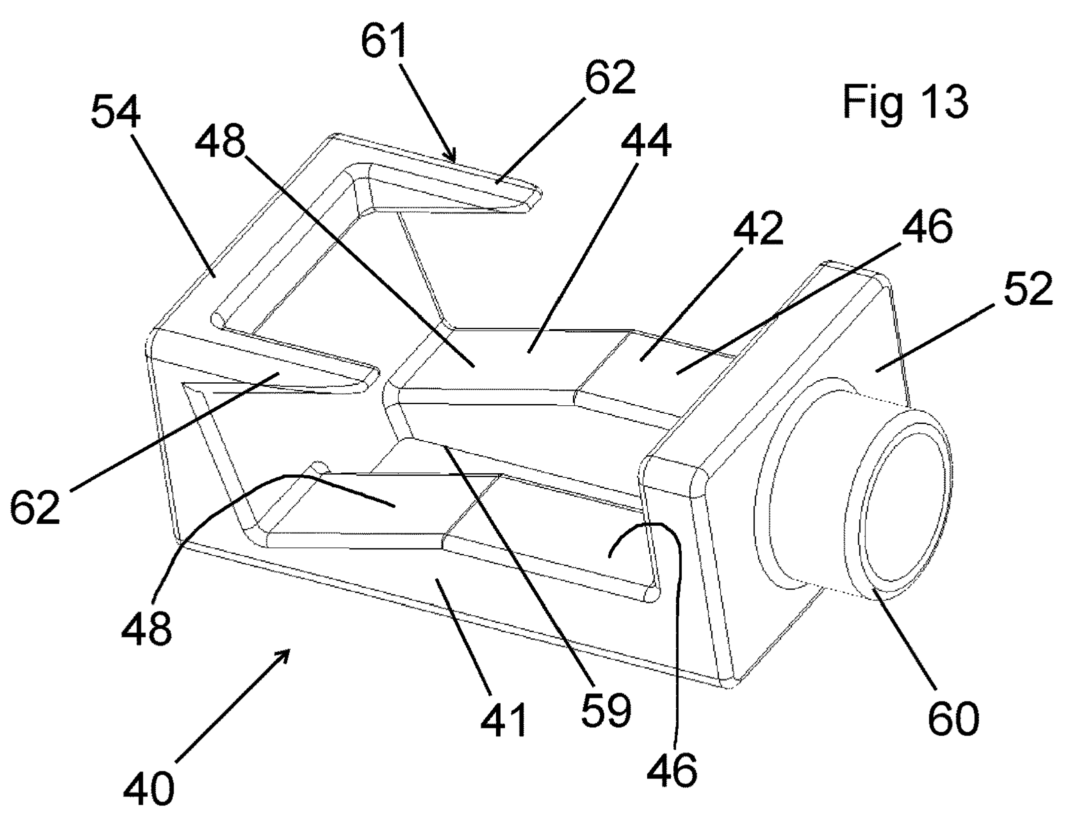
FIG. 13 is a perspective view from above of a conveying component.
Figure 14:
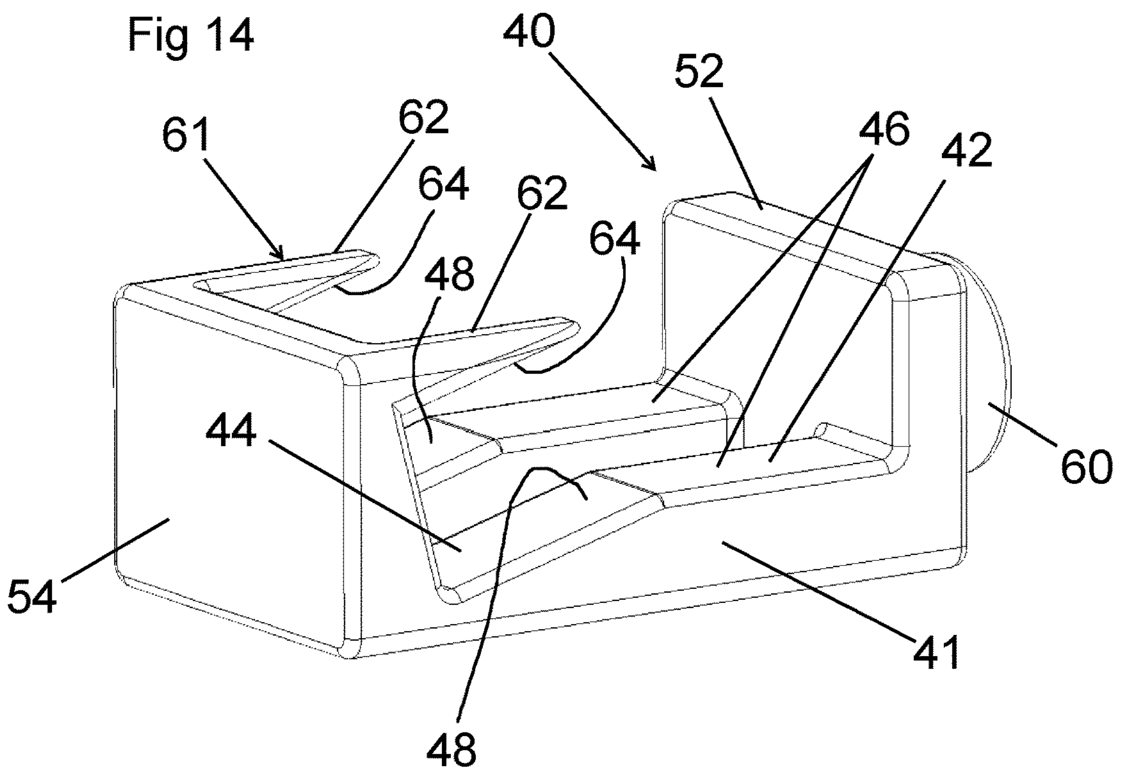
FIG. 14 is a perspective side view of the conveying component.

The support member 12 and the two fastening arrangements 24 constitute a connecting apparatus. A further connecting apparatus 100 is shown in FIGS. 13 and 14.

The holding component 26 comprises a main part 30 defining the through hole 28, and opposite pivot members 32 extending from the main part 30. The support member 12 defines opposite pivot apertures 34 in which the pivot members 32 are received. When so received, the pivot members 32 pivotally attach the holding component 26 to the support member 12.

Figures 5, 6:
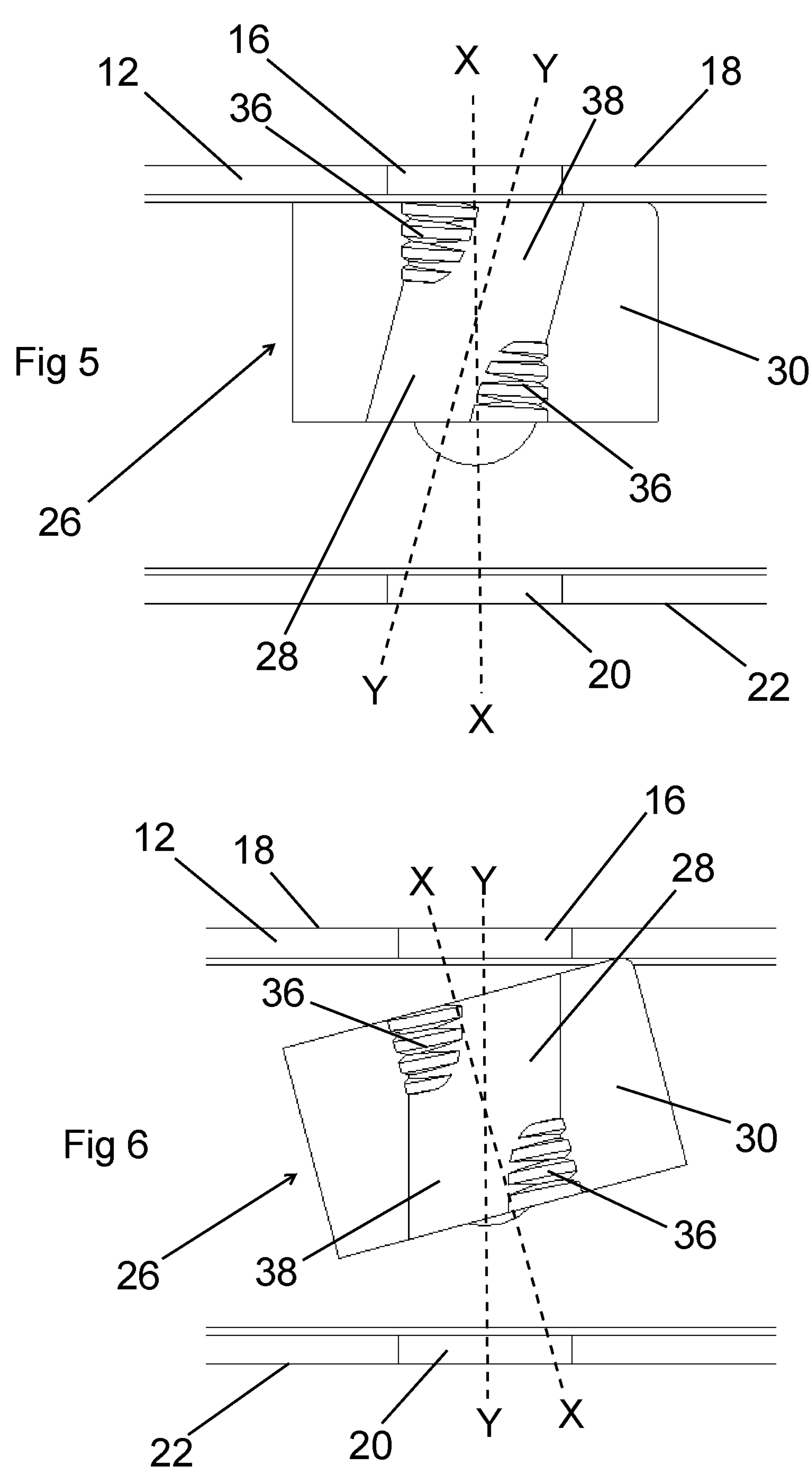
FIG. 5 is a sectional side view of the holding component and the support member, showing the holding component in a holding position.
FIG. 6 is a sectional side view of the holding component and the support member, showing the holding component in a released position.

The holding component 26 can be tilted relative to the support member 12 between a holding position shown in FIG. 5 and a release position shown in FIG. 6. The tilting of the holding component 26 is effected by pivoting the holding component 26 about the pivot members 32.

Referring to FIGS. 5 to 8, the through hole 28 has two threaded holding regions 36 and a release region 38. The holding regions 36 are arranged opposite each other and extend along a first main axis X-X. The release region 38 extends between the holding regions 36, and has a second main axis Y-Y.

The first main axis X-X of the holding regions 36 is arranged obliquely relative to the second main axis Y-Y of the release region 38, at an angle of about 15°. Thus, the release region 38 is angled relative to the holding regions 36 at an angle of about 15°.

When the holding component 26 is in the holding position, the threaded rod 14 extends through the holding regions 36 along the main axis X-X. In this position, the holding regions 36 of the through hole 28 are aligned with the upper and lower openings 16, 20, and the threads of the holding regions 36 engage the threads of the threaded rod 14, whereby the holding component 26 holds the threaded rod 14.

When the holding component 26 is in the release position, the threaded rod 14 extends through the release region 38 along the main axis Y-Y. In this position, the release region 38 of the through hole 28 is aligned with the upper and lower openings 16, 20, and the threads of the threaded rod 14 do not engage any threads on the holding component 26. As a result, the threaded rod 14 is released from the holding component 26, thereby allowing the support member 12 to be moved along the threaded rod 14, or removed therefrom.

Each fastening arrangement 24 comprises a conveying component 40 in the form of a carriage on which the holding component 26 is mounted. The conveying component 40 slides longitudinally along the support member 12. The conveying component 40 and the holding component 26 together provide a cartridge.

Figure 15:
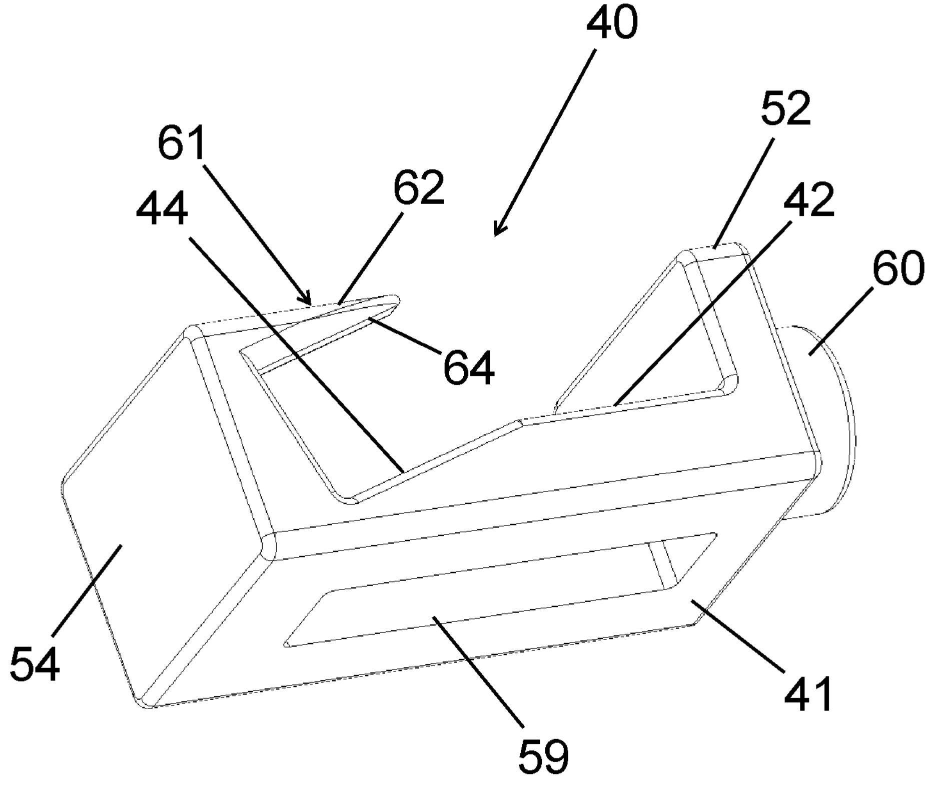
FIG. 15 is a perspective view from below of the conveying component.

The conveying component 40 is shown in FIGS. 13 to 15, and has a base 41 comprising first and second engaging regions 42, 44 for engaging the holding component 26. The first engaging region 42 comprises two substantially parallel spaced first surfaces 46. The second engaging region 44 comprises two substantially parallel spaced second surfaces 48.

The first and second engaging regions 42, 44 of the conveying component 40 are arranged at an angle of about 195° relative to each other. The support member 12 has a principal axis Z-Z. The first engaging region 42 extends parallel to the principal axis Z-Z. The second engaging region 44 extends at an angle of about 15° to the principal axis Z-Z.

Figure 10:
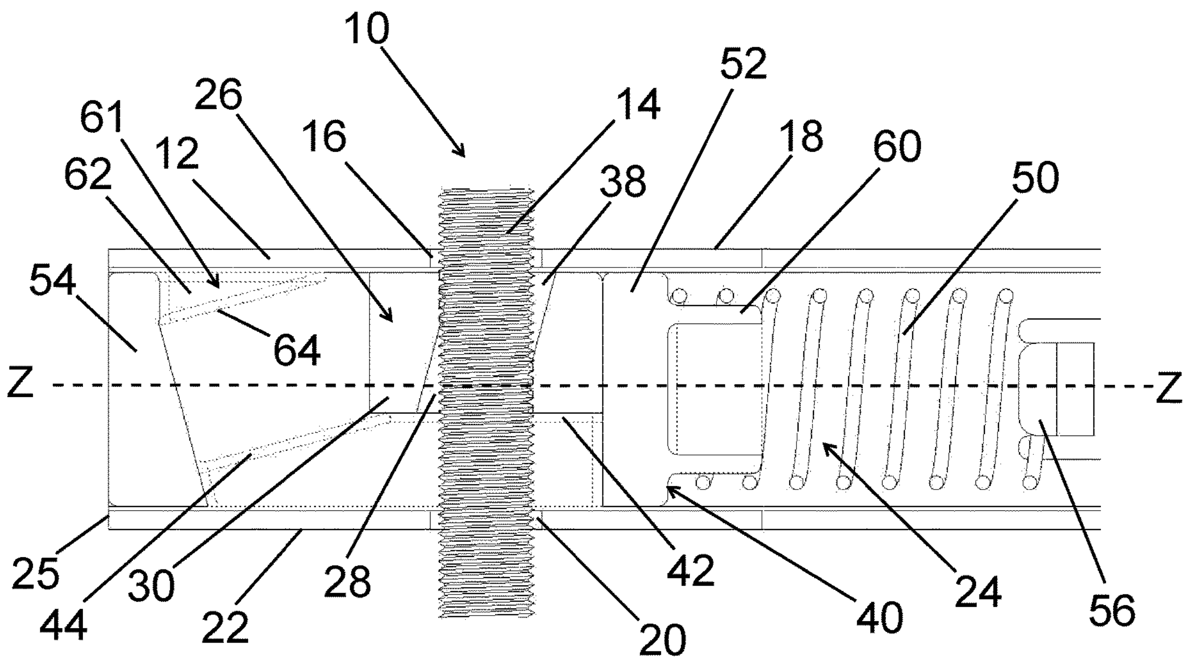
FIG. 10 is a view similar to FIG. 9, including a conveying component.
Figure 11:
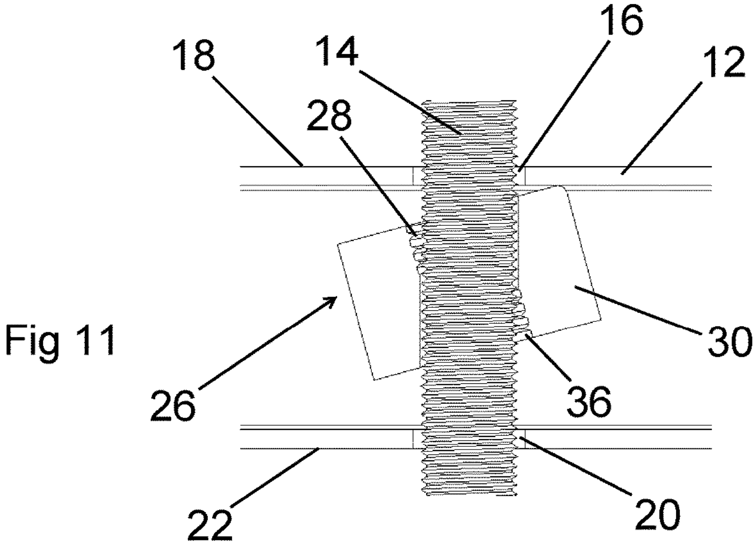
FIG. 11 is a sectional side view of the holding component and an elongate member, showing the holding component in a release position.
Figure 12:
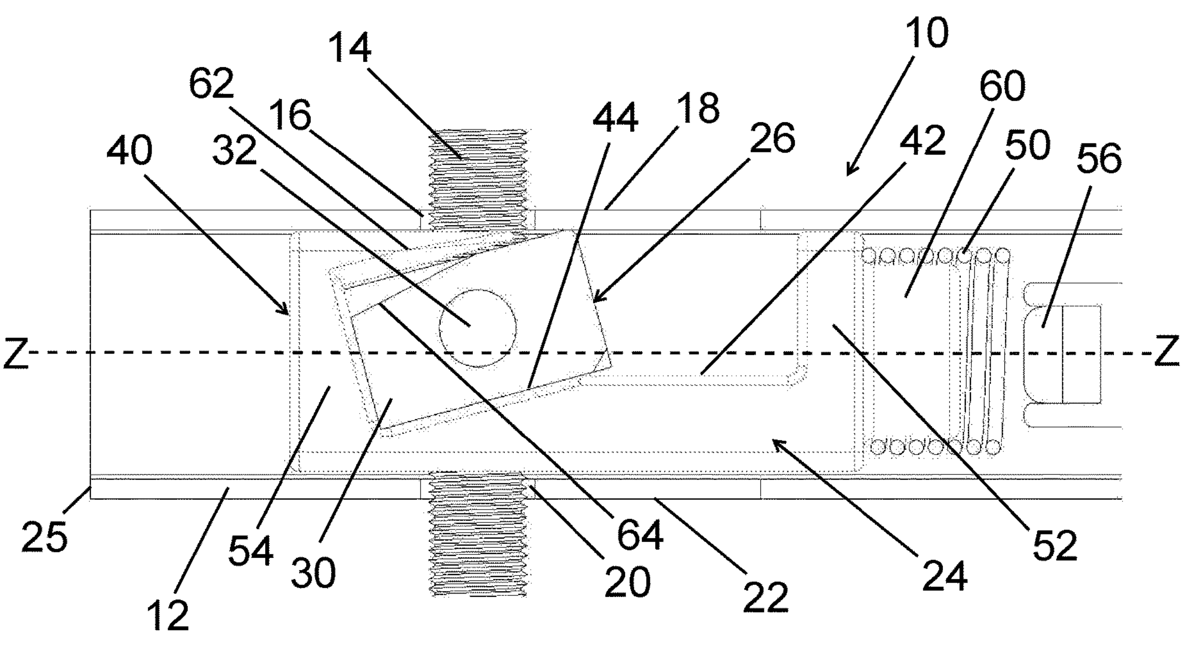
FIG. 12 is a view similar to FIG. 11, including a conveying component.

Referring to FIGS. 10 and 12, the conveying component 40 can be moved between first and second positions. In the first position, shown in FIG. 10, the first engaging region 42 receives the holding component 26 on the first surfaces 46. In the second position, shown in FIG. 12, the second engaging region 44 receives the holding component 26 on the second surfaces 48. The threaded rod 14 extends between the first surfaces 46 when the conveying component 40 is in the first position, and between the second surfaces 48 when the carriage is in the second position.

In the first position, the first engaging region 42 is aligned with the openings in the support member 12. In this position, the holding component 26 is disposed on the first surfaces 46 of the conveying component 40 in the holding position.

In the second position, the second engaging region 44 is aligned with the openings in the support member 12. In this position, the holding component 26 is disposed on the second surfaces 48 of the conveying component 40 in the release position.

Thus, as the conveying component 40 moves between the first position shown in FIG. 10, and the second position shown in FIG. 12, the holding component 26 is tilted between the holding position and the release position by the change in angles of the first and second surfaces 46, 48.

The fastening arrangement 24 further includes an urging member 50 in the form of a compression spring to urge the conveying component 40 to the first position. The conveying component 40 has opposite first and second end portions 52, 54. The urging member 50 extends from the first end portion 52 to a reaction formation 56 on the support member 12.

The base member 41 defines an aperture 59. When the threaded rod 14 extends through the fastening arrangement 24, the threaded rod 14 passes through the aperture 59. The aperture 59 is defined between the two first surfaces 46 and between the two second surfaces 48.

A locating formation 60, in the form of a cylindrical lug, is provided on the first end portion 52, and extends therefrom towards the reaction formation 56. One end of the urging member 50 engages around the locating formation 60. The opposite end of the urging member 50 engages the reaction formation 56.

The reaction formation 56 comprises opposite cut-out regions of the support member 12. The cut-out regions are deformed inwardly of the support member 12. The reaction formation 56 extends across the conveying component 40.

The second end portion 54 of the conveying component 40 extends across the open end of the support member 12. The second end portion 54 can be pressed inwardly by a user to move the conveying component 40 against the force applied by the urging member 50. This moves the conveying component 40 from the first position to the second position, and causes the holding component 26 to slide onto the second surface 48, thereby tilting the holding component 26 to the release position.

The conveying component 40 and the holding component 26 further include cooperating guide formations 61, 63. The guide formations 61 of the carriage cooperate with the guide formations 63 of the holding component 26 to guide the holding component 26 to the release position as the conveying component 40 slides from the first position to the second position.

The guide formations 61 of the conveying component 40 comprise two projections 62 extending from the second end portion 54 towards the first end portion 52. The projections 62 have sloping lower surfaces 64.

Figure 7:
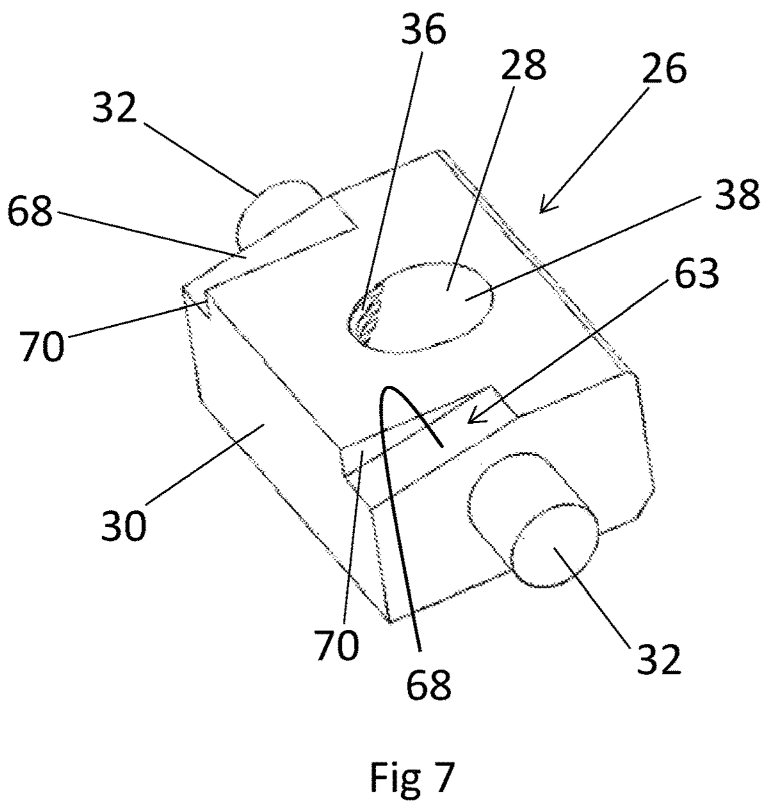
FIG. 7 is a perspective view of the holding component.
Figure 8:
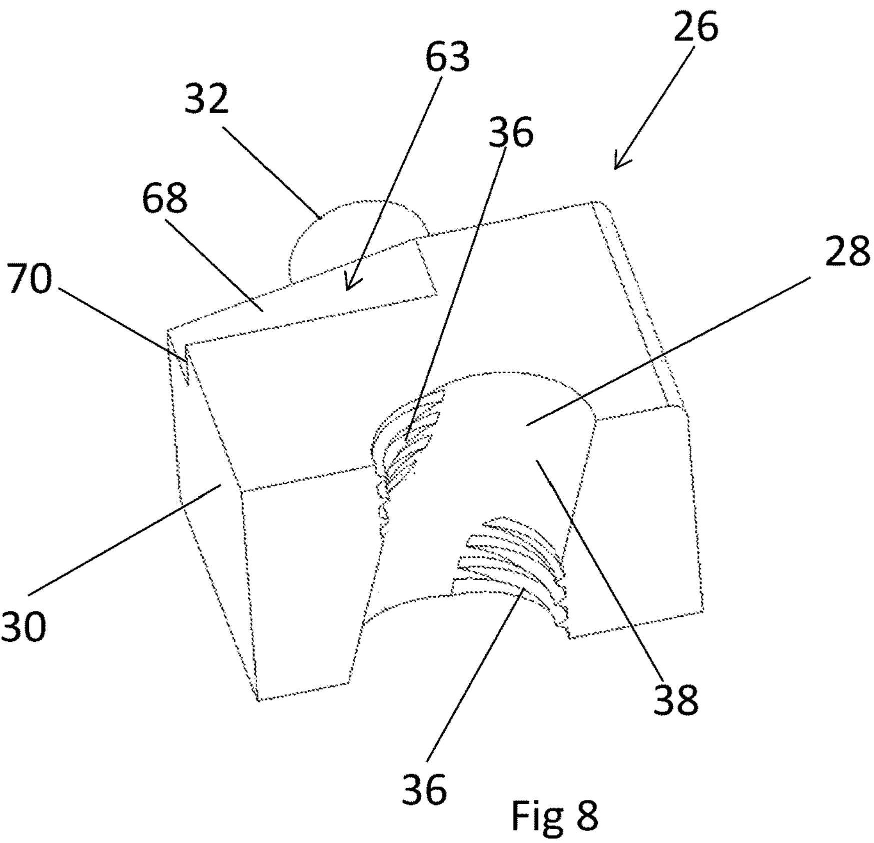
FIG. 8 is a perspective sectional view of the holding component.
Figure 9:
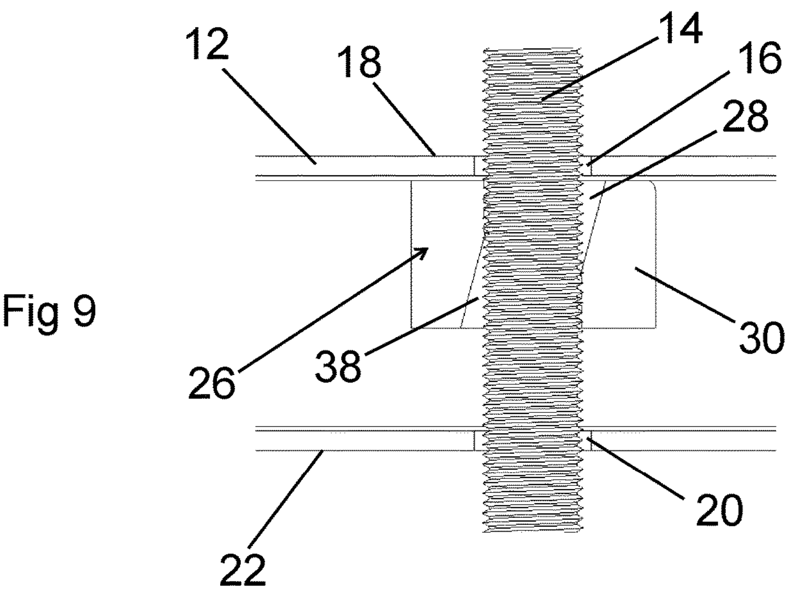
FIG. 9 is a sectional side view of the holding component and an elongate member, showing the holding component in a holding position.

Referring FIGS. 7 and 8, the guide formations of the holding component 26 comprise sloping surfaces 68 provided in recessed regions 70 defined at opposite sides of the main part 30. The through hole 28 is defined in the main part 30 between the guide formations of the holding component 26.

As the conveying component 40 moves from the first position to the second position, the sloping surfaces of the conveying component 40 slide across the sloping surfaces of the holding component 26, thereby guiding the holding component 26 to the release position.

Figure 16:
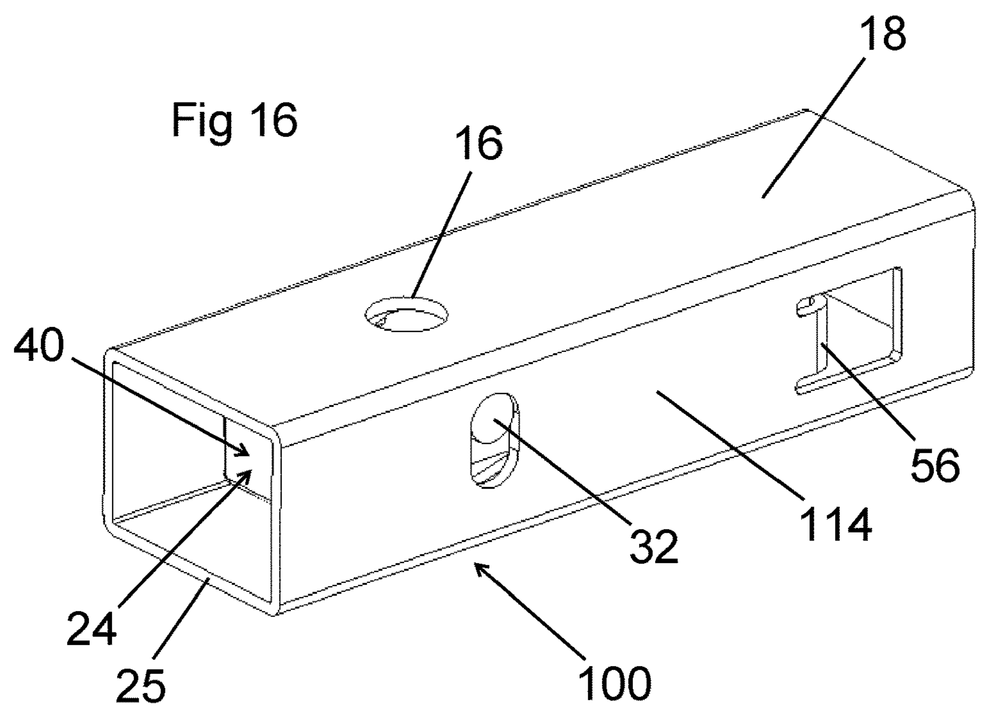
FIG. 16 is a perspective view of a connecting apparatus comprising a support member and a fastening arrangement.
Figure 17:
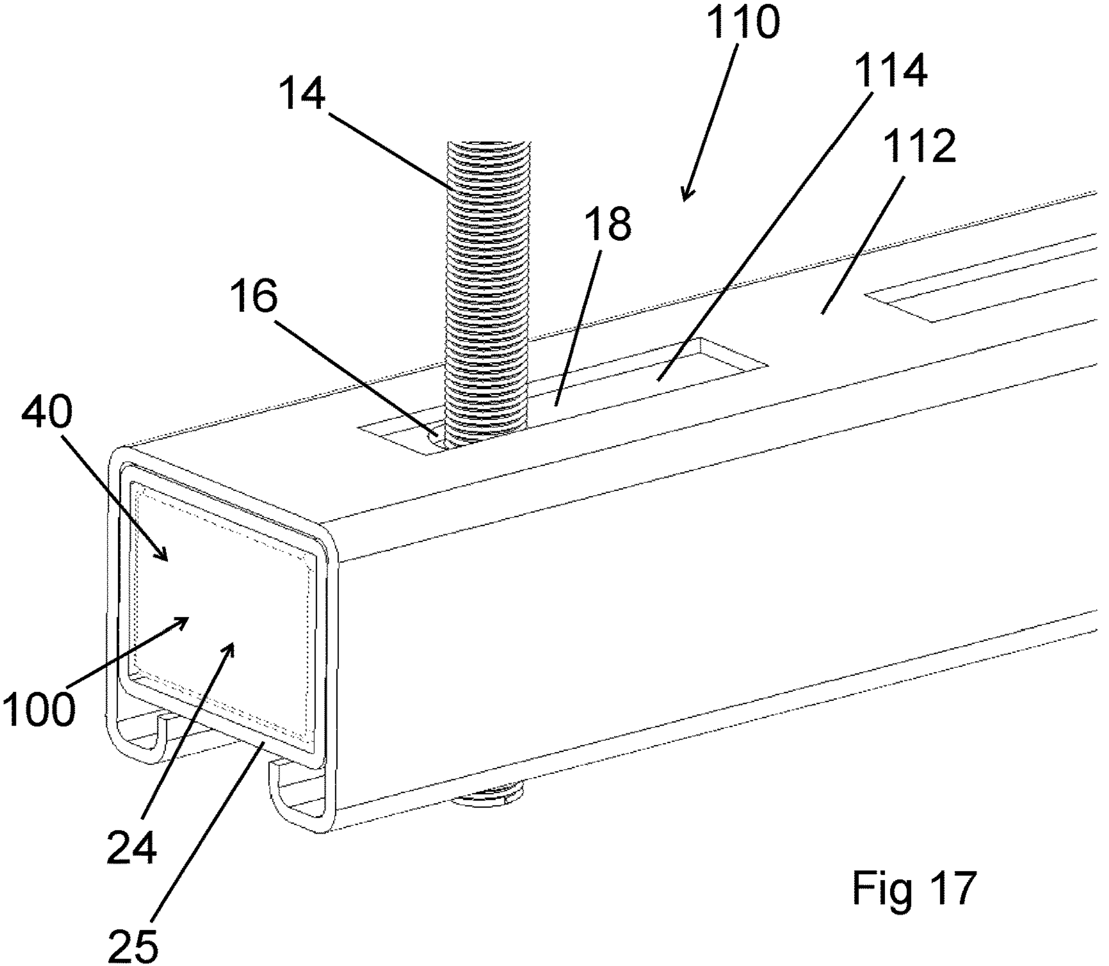
FIG. 17 is a perspective view of an end region of a suspension assembly incorporating the connecting apparatus.

FIGS. 16 and 17 show a connecting apparatus 100 in the form of a cartridge. The connecting apparatus 100 is receivable in a further support member 112 at one end region of the further support member 112, as shown in FIG. 17. Another connecting apparatus 100 is received in the opposite end of the further support member 112, thereby providing a further suspension assembly, generally designated 110. Threaded rods 14 are inserted through the further support member 112 and both connecting apparatus 100.

The connecting apparatus 100 comprises the fastening arrangement 24 and a support member, generally designated 114. The support member 114 differs from the support member 12 in that the support member 114 is intended to support the further support member 112, and in that the support member 114 holds only one of the fastening arrangements 24. The latter difference allows the connecting apparatus to be used within the further support member 112 to form the further suspension assembly 110.

There is thus described a suspension assembly 10, 110 and a connecting apparatus 100 which provide are quick and easy to install to provide supports for the fitting of electrical, HVAC or piping systems. The suspension assembly 10, 110 and the connecting apparatus 100 significantly expedites the installation process by removing the need to fit nuts and washers to the threaded rod 14.

The pivotable holding component 26 allows rapid installation, adjustment, and optional release of the suspension assembly 10, 110. The conveying component 40 allows push-button release of the threaded rod 14. The suspension assembly 10, 110 and the connecting apparatus 100 can be pre-assembled, thereby avoiding the need to carry multiple components (nuts, washers etc) on site.

Various modifications can be made without departing from the scope of the invention.

The invention claimed is:

1. A connector comprising:

a support; and a cartridge mounted on the support, the cartridge comprising a fastener for fastening an elongate suspension member to the connecting apparatus;

wherein the fastener comprises a holder for holding the elongate member, the holder defining a through hole for receiving the elongate member through the holder, the through hole having a holding region and a release region, the holder having cooperating formations at the holding region to cooperate with corresponding formations on the elongate member;

wherein the holder is movable relative to the support between a holding position and a released position;

whereby, in the holding position, the elongate member can be received in the holding region, and the cooperating formations of the holder cooperate with the corresponding formations of the elongate member to fasten the elongate member to the holder, and in the released position, the elongate member can be received in the release region, thereby allowing the elongate member to be released from the holder;

wherein the fastener further comprises a tilting arrangement for tilting the holder between the holding and released positions; and wherein the fastener further includes a spring to urge the holder to the holding position, and wherein the tilting arrangement comprises a conveying component to convey the holder between the holding and released positions, the spring engaging the conveying component.

2. A connecting apparatus according to claim 1, wherein the holder is pivotally movable relative to the support between the holding and released positions.

3. A connecting apparatus according to claim 1, wherein the fastener further includes an urging member to urge the holder to the holding position.

4. A connecting apparatus according to claim 1, wherein the holding region and the release region of the through hole extend obliquely relative to each other, the holding region having a first main axis along which the elongate member can extends when the holder is in the holding position.

5. A connecting apparatus according to claim 4, wherein the through hole has a further holding region, the release region being arranged between the holding region and the further holding region, the first main axis of the holding region being the main axis of the further holding region, the holder comprising cooperating formations at the further holding region.

6. A connecting apparatus according to claim 4, wherein the release region has a second main axis along which the elongate member extends when the holder is in the released position, the first main axis and the second main axis extending obliquely relative to each other.

7. A connecting apparatus according to claim 1, wherein the conveying component is movable along the support to effect tilting of the holder, the conveying component being slidable along the support to effect tilting of the holder.

8. A connecting apparatus according to claim 1, wherein the conveying component comprises a first engaging region for receiving the holder in the holding position and a second engaging region for receiving the holder in the released position.

9. A connecting apparatus according to claim 8, wherein the conveying component is movable between a first position in which the first engaging region of the movable member receives the holder, and a second position in which the second engaging region of the conveying component receives the holder.

10. A connecting apparatus according to claim 8, wherein the first and second engaging regions are arranged obliquely relative to each other.

11. A connecting apparatus according to claim 8, wherein the first engaging region has a first surface for engaging the holder, and the second engaging region has a second surface for engaging the holder.

12. A connecting apparatus according to claim 11, wherein the first engaging region has two of the aforesaid first surfaces, the first surfaces being spaced from each other, and the first surfaces extending substantially parallel to each other, and wherein the second engaging region has two of the aforesaid second surfaces, the second surfaces being spaced from each other, and the second surfaces extending substantially parallel to each other.

13. A connecting apparatus according to claim 1, wherein the conveying component and the holder have cooperating guide formations for guiding the holder to the release position.

14. A connecting apparatus according to claim 13, wherein the guide formations of the holder comprise sloping surfaces on the main part, the sloping surfaces being provided in recesses defined by the main part.

15. A connecting apparatus according to claim 13, wherein the conveying component has opposite first and second end portions, and the guide formations of the conveying component comprise projecting members extending from the second end portion towards the first end portion.

16. A connecting apparatus according to claim 13, wherein the guide formations of the holder and the conveying component comprise cooperating surfaces that slide across one another as the holder moves to the release position.

17. A connecting apparatus according to claim 1, wherein the holder is pivotally mounted on the support, the holder comprising a main part defining the through hole, and the holder comprising a pivot member extending from the main part, the pivot member being received in a pivot aperture defined by the support.

18. A fastener comprising:

a holder defining a through hole for receiving an elongate member through the holder, the through hole having a holding region and a release region, the holder having cooperating formations at the holding region;

wherein the holder is movable between a holding position and a released position;

whereby, in the holding position, the elongate member can be received in the holding region, and the cooperating formations of the holder cooperate with corresponding formations of the elongate member to fasten the elongate member to the holder, and in the released position, the elongate member can be received in the release region, thereby allowing the elongate member to be released from the holder wherein the fastener further comprises a tilting arrangement for tilting the holder between the holding and released positions; and wherein the fastener further includes a spring to urge the holder to the holding position, and wherein the tilting arrangement comprises a conveying component to convey the holder between the holding and released positions, the spring engaging the conveying component.

* * * * *